United States Patent
Saito (10) Patent No.: US 6,694,475 B1
(45) Date of Patent: Feb. 17, 2004

(54) MAGNETIC DISK APPARATUS AND METHOD OF DATA TRANSFER

(75) Inventor: Kenji Saito, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/581,623

(22) PCT Filed: Dec. 16, 1998

(86) PCT No.: PCT/JP98/05695

§ 371 (c)(1),
(2), (4) Date: Aug. 29, 2000

(87) PCT Pub. No.: WO99/31572

PCT Pub. Date: Jun. 24, 1999

(30) Foreign Application Priority Data

Dec. 17, 1997 (JP) ............................................. 9-363729
Mar. 27, 1998 (JP) ......................................... 10-098262

(51) Int. Cl.[7] ............................................. G11C 29/00
(52) U.S. Cl. ........................ 714/763; 714/752; 714/801
(58) Field of Search ................................. 714/763, 764, 714/801, 6, 799, 52, 770, 758

(56) References Cited

FOREIGN PATENT DOCUMENTS

| JP | 08-76940 | * | 3/1996 |
| JP | 8-76940 | | 9/1996 |
| JP | 9-218753 | | 8/1997 |
| JP | 10-105476 | | 4/1998 |

* cited by examiner

Primary Examiner—Phung M. Chung
(74) Attorney, Agent, or Firm—McDermott, Will & Emery (57) ABSTRACT

A magnetic disk apparatus for high-speed transfer of large amounts of data to a magnetic disk, which uses a redundant disk array system capable of error correction. The apparatus comprises generator means (13) for providing error-correcting information about data that are input in error correction batches from an external device, a magnetic disk (17) for storing the data input in error correction batches from the external device and the corresponding error-correcting information, and high-speed storage means (12) for temporarily storing data received from the external device. Input data from the external device are stored temporarily in the high-speed storage means, and when a complete batch of data for error correction has been stored, the batch of data is transferred both to the magnetic disk and to the generator means to provide error-correcting information.

8 Claims, 11 Drawing Sheets

Fig. 5 xb=a xor b
xc=xb xor c
xd=xc xor d

Flow of time

MAGNETIC DISK APPARATUS AND METHOD OF DATA TRANSFER

TECHNICAL FIELD

The present invention relates to a magnetic disk apparatus composed of an redundant array of inexpensive disks (hereinafter called RAID system) for dividing, transferring and storing data from an external device in plural magnetic disks, generating error-correcting information and storing in the magnetic disks, and a method of data transfer.

BACKGROUND ART

Initially, the RAID system is a data storage system for dividing and storing large amounts of data entering from an external device (for example, a host computer) in plural magnetic disks, so that large amounts of data can be promptly written into magnetic disks as hard disks. Hitherto, the RAID is classified into the following five kinds according to the difference in the method of dividing and storing the data in plural magnetic disks.

The first is the RAID(0) for only dividing and storing the data in magnetic disks in sector units, the second is the RAID(1) for storing same data in plural magnetic disks in duplicate, the third is the RAID(2) and RAID(3) (as classified by compiling method of error-correcting information, for example, Hamming/parity) for dividing and storing the data in magnetic disks in bit units, compiling error-correcting information at this time and storing in an exclusive magnetic disk, the fourth is the RAID(4) for dividing and storing the data in magnetic disks in sector units, compiling error-correcting information at this time and storing in an exclusive magnetic disk for error-correcting information, and the fifth is the RAID(5) for dividing the data in sector units, storing recursively in magnetic disks, and storing the error-correcting information compiled at this time recursively in magnetic disks in sector units same as other information (without using exclusive magnetic disk for error-correcting information).

Referring next to FIG. 11, the types of RAID, that is, RAID(0) to RAID(5) are described in detail below. FIG. 11 shows the configurations of RAID(0) to RAID(5), in which (A) relates to RAID(0), (B) to RAID(1), (C) to RAID(2) and RAID(3), (D) to RAID(4), and (E) to RAID(5).

FIG. 11 (A) shows the RAID(0) 1 for only dividing and storing the input data in magnetic disks in sector units. In the RAID(0) 1, plural magnetic disks (called hard disk devices (HDD) or disks) 61 to 64 are operated simultaneously, and, for example, write data 7 transferred from the host or the like is divided and stored in the disks 61 to 64, and the data entered in the disks 61 to 64 can be transferred at high speed, but error correction of data stored in a defective magnetic disk is disabled.

FIG. 11 (B) shows the RAID(1) 2, which stores the entered data, for example, the same data in sector units of write data 7 transferred from the host in duplicate in plural magnetic disks (disks) 65 and 66. The RAID(1) 2 is also known as the mirrored disk, and it is the storage method of high reliability, but since the same data is stored in duplicate, the efficiency of use of hard disks is poor.

FIG. 11 (C) shows the RAID(2) or RAID(3) 3 for dividing and storing the entered data, for example, the write data 7 transferred from the host in plural magnetic disks (disks) 67 to 70 in bit units, generating error-correcting information of the stored data, and storing in a disk 71. Between the RAID(2) and RAID(3), the manner of generating error-correcting information about the defective magnetic disk is different, for example, parity method or Hamming method.

FIG. 11 (D) shows the RAID(4) 4 for dividing and storing the entered data, for example, the write data 7 transferred from the host in plural magnetic disks (disks) 72 to 75 in sector units, generating error-correcting information for defective magnetic disk, and storing in a disk 76.

FIG. 11 (E) shows the RAID(5) 5 for dividing and storing recursively the entered data, for example, the write data 7 transferred from the host in plural magnetic disks (disks) 77 to 81 in sector units, generating error-correcting information P for defective magnetic disk, and storing in the disks 77 to 81 recursively.

Among these RAID(0) 1 to RAID(5) 5, in the RAID(1) 2 to RAID(5) 5, if a trouble occurs in any one of the disks 65 to 81, information of the defective disk is created by using the error-correcting information, and the information can be read out to an external device (for example, the host computer). In the RAID(0) 1, the data can be transferred and written at high speed, such as video and audio data, but if any one of the disks 61 to 64 has a trouble, the data cannot be read out.

Thus, in the magnetic disk apparatus (or hard disk apparatus) composed of such conventional RAID system, except for the RAID(0), if one of the magnetic disks has a trouble, the information of the defective magnetic disk can be created from the error-correcting information, and the operation can be continued. However, except for the RAID (0), when writing data, the error-correcting information must be created from the write data, and the write time is very long as compared with the case of writing in the RAID(0) in which the job time is dividing and recording only without making error-correcting information.

When storing and reproducing large amounts of video and audio data in magnetic disks, fast transfer of mass data is needed, and usually the RAID(0) is employed. In recording or reproducing of video and audio data, although high reliability by the use of error-correcting information is required, in the RAID(0), if a trouble occurs in one of the disks 61 to 64, data cannot be read out, and error cannot be corrected.

The invention is devised to solve the problems of the prior arts, and it is an object thereof to present a magnetic disk apparatus and a method of data transfer capable of transferring data fast, as a speed as high as in the RAID(0), when transferring and storing mass data such as video and audio data in magnetic disks by using the RAID(4) or RAID(5) capable of correcting error.

SUMMARY OF THE INVENTION

The magnetic disk apparatus as set forth in claim 1 of the invention comprises a CPU for controlling analysis and transfer of data, communication means for receiving data from an external device and issuing, error-correcting information generating means for generating error-correcting information for the information in the error-correcting information generating unit including at least the data entered from the external device, magnetic disks for storing the data in the error-correcting information generating unit including the data from the external device and its error-correcting information, high-speed storage means for temporarily storing the data from the external device, and data transfer means for transferring data by connecting the CPU and each means, in which the data entered from the external device is temporarily stored in the high-speed storage means, and when all data in the error-correcting information generating unit including the entered data is stored, all data in the error-correcting information generating unit is transferred to the magnetic disks and simultaneously transferred also to the error-correcting information generating means.

The invention thus provides the magnetic disk apparatus for storing write data from the external device in the high-speed storage means in the error-correcting information generating unit, transferring all data to magnetic disks at once when storing all data in the error-correcting information generating unit, and eavesdropping on all transferred data by the error-correcting information generating means, and therefore writing of data in the magnetic disks and creation of error-correcting information are executed simultaneously to save the error-correcting information creation time, so that the data writing time can be shortened.

In the magnetic disk apparatus as set forth in claim 2 of the invention, the high-speed storage means includes plural storage regions for storing all data in the error-correcting information generating unit including the data entered from the external device, the entered data is divided and stored in each storage region specified by the external device, and when all data in the error-correcting information generating unit is stored in one storage region, all data can be transferred simultaneously to the magnetic disks and error-correcting information generating means.

The invention thus provides the magnetic disk apparatus in which plural storage regions are provided for storing all data in the error-correcting information generating unit, classifying and storing the written data from the external device in each divided storage region of the high-speed storage means, and transferring all data to the magnetic disks and error-correcting information generating means simultaneously when all data in the error-correcting information generating unit is stored and it is ready to create error-correcting information, and therefore plural data groups in the error-correcting information generating unit can be received, and the data group ready for creation of error-correcting information can be first transferred to the magnetic disks, so that the transfer efficiency is enhanced.

The magnetic disk apparatus as set forth in claim 3 of the invention comprises a CPU for controlling analysis and transfer of data, communication means for receiving data from an external device and issuing, error-correcting information generating means for generating error-correcting information for the information in the error-correcting information generating unit including at least the data entered from the external device, magnetic disks for storing the data in the error-correcting information generating unit including the data from the external device and its error-correcting information, high-speed storage means for temporarily storing the data from the external device, and data transfer means for transferring data by connecting the CPU and each means, in which input data from outside is classified and stored in the error-correcting information generating unit on the high-speed storage means, the stored data is transferred to plural magnetic disks in the magnetic disk units, the transfer data is simultaneously transferred to the error-correcting information generating means to create error-correcting information, the error-correcting information generating means has plural second high-speed storage means, and therefore in the generating process of error-correcting information, writing job and reading job can be executed parallel in each second high-speed storage means.

The magnetic disk apparatus as set forth in claim 4 of the invention relates to the invention as set forth in claim 3, in which the plural second high-speed storage means are two pieces, and while operating the previous stored data being read out from one second high-speed storage means and next transfer data, the result is written into other second high-speed storage means.

In the magnetic disk apparatus according to the invention as set forth in claim 3 and claim 4, high-speed memories of similar grade are used in the high-speed storage means and plural internal memories of the parity generator so as to execute and complete simultaneously, and therefore in spite of creation of error-correcting information from the write data corresponding to the HDD, mass data can be transferred at high speed nearly as in the RAID(0).

The method of data transfer of a magnetic disk apparatus as set forth in claim 5 of the invention comprises the steps of receiving data to be stored in magnetic disks from an external device and its write command, storing all data in the error-correcting information generating unit to which the data received from the external device belongs temporarily in a storage region of high-speed storage means, and transferring all data in the error-correcting information generating unit temporarily stored in the storage region of the high-speed storage means to the magnetic disks and error-correcting information generating means simultaneously, and therefore all data in the error-correcting information generating unit to which the data received from the external device belongs is sequentially stored in the storage region of the high-speed storage means until all is stored, and all data in the error-correcting information generating unit stored in the storage region is transferred to the magnetic disk and error-correcting information generating means simultaneously.

The invention provides the method of data transfer of a magnetic disk apparatus for storing all data in the error-correcting information generating unit to which the data received from the external device belongs sequentially in the storage region of the high-speed storage means until all is stored, and transferring all data in the error-correcting information generating unit stored in the storage region to the magnetic disks and error-correcting information generating means simultaneously, and therefore writing of data in the magnetic disks and creation of error-correcting information are executed simultaneously to save the error-correcting information creation time, so that the data writing time can be shortened.

The method of data transfer of a magnetic disk apparatus as set forth in claim 6 of the invention relates to the method as set forth in claim 5, in which the high-speed storage means has plural storage regions for storing temporarily all data in the error-correcting information generating unit to which the data received from the external device belongs, comprising the steps of dividing and storing the received data in the storage region specified by the external device, and when receiving all data in the error-correcting information generating unit in one storage region, transferring all data to the magnetic disks and error-correcting information generating means simultaneously.

The invention provides the method of data transfer of a magnetic disk apparatus in which the high-speed storage means has plural storage regions for storing temporarily all data in the error-correcting information generating unit to which the data received from the external device belongs, for dividing and storing the received data in each storage region, and when receiving all data in the error-correcting information generating unit in one storage region to be ready to create error-correcting information, transferring all data to the magnetic disks and error-correcting information generating means simultaneously, and therefore plural data groups in the error-correcting information generating unit can be received, and the data group ready for creation of error-correcting information can be first transferred to the magnetic disks, and the transfer time is saved so that the transfer efficiency is further enhanced.

In the present invention, since the error-correcting information generating means eavesdrops on the data transferred on the CPU bus, the constitution of the magnetic disk of the error-correcting information generating unit is not specified by the hardware and hence can be set freely. For example, connecting seven magnetic disks to the magnetic disk communication means, six may be used for data and one may be used for setting the error-correcting information, or by connecting four magnetic disks, three may be used for data and one may be used for setting the error-correcting information. Thus, by changing the number of magnetic disks being connected, it is possible to widen the setting range of the storage capacity.

BEST MODE FOR CARRYING OUT THE INVENTION

First Embodiment

Figure 1:
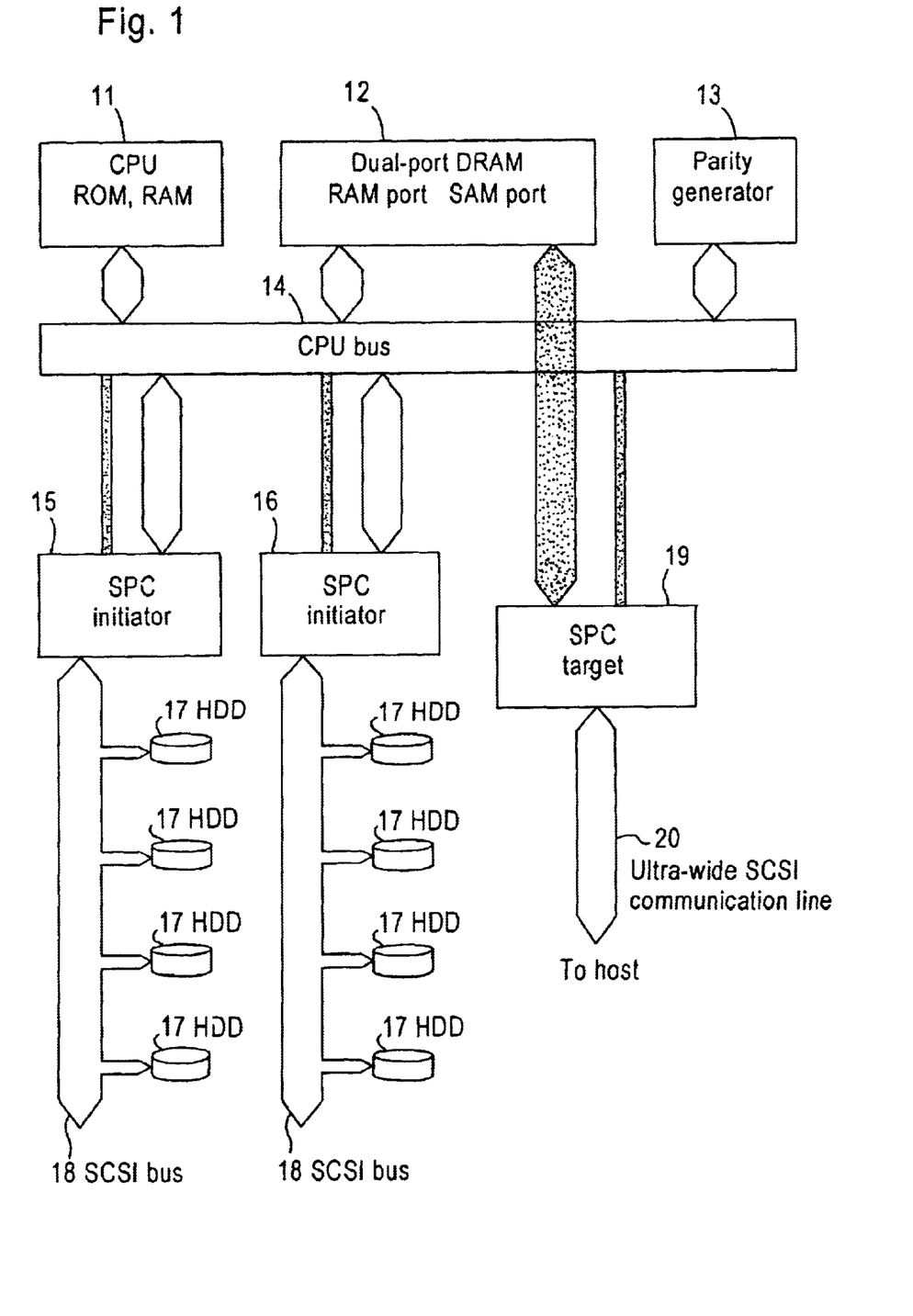
FIG. 1 is a diagram showing a configuration of a magnetic disk apparatus according to RAID system in first and second embodiments of the invention.
Figure 2:
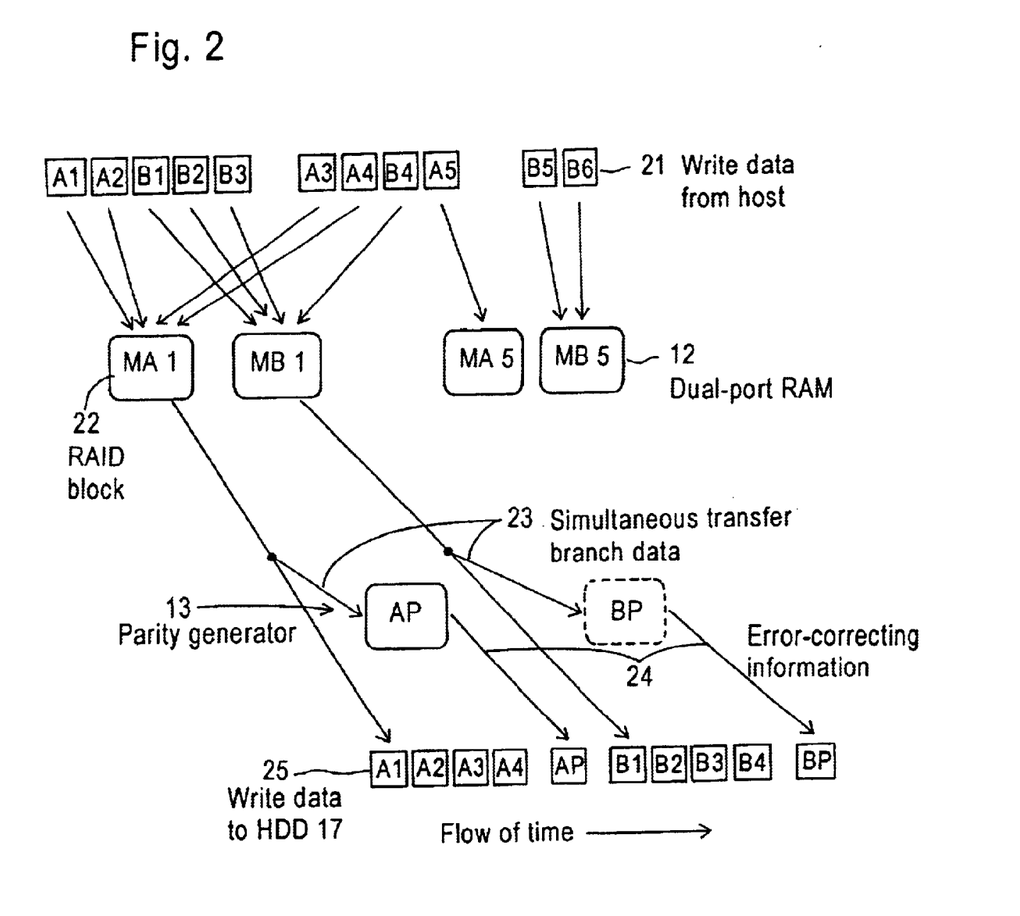
FIG. 2 is a diagram showing the procedure of creating error-correcting information from write data by the operation of the magnetic disk apparatus in FIG. 1.
Figure 3:
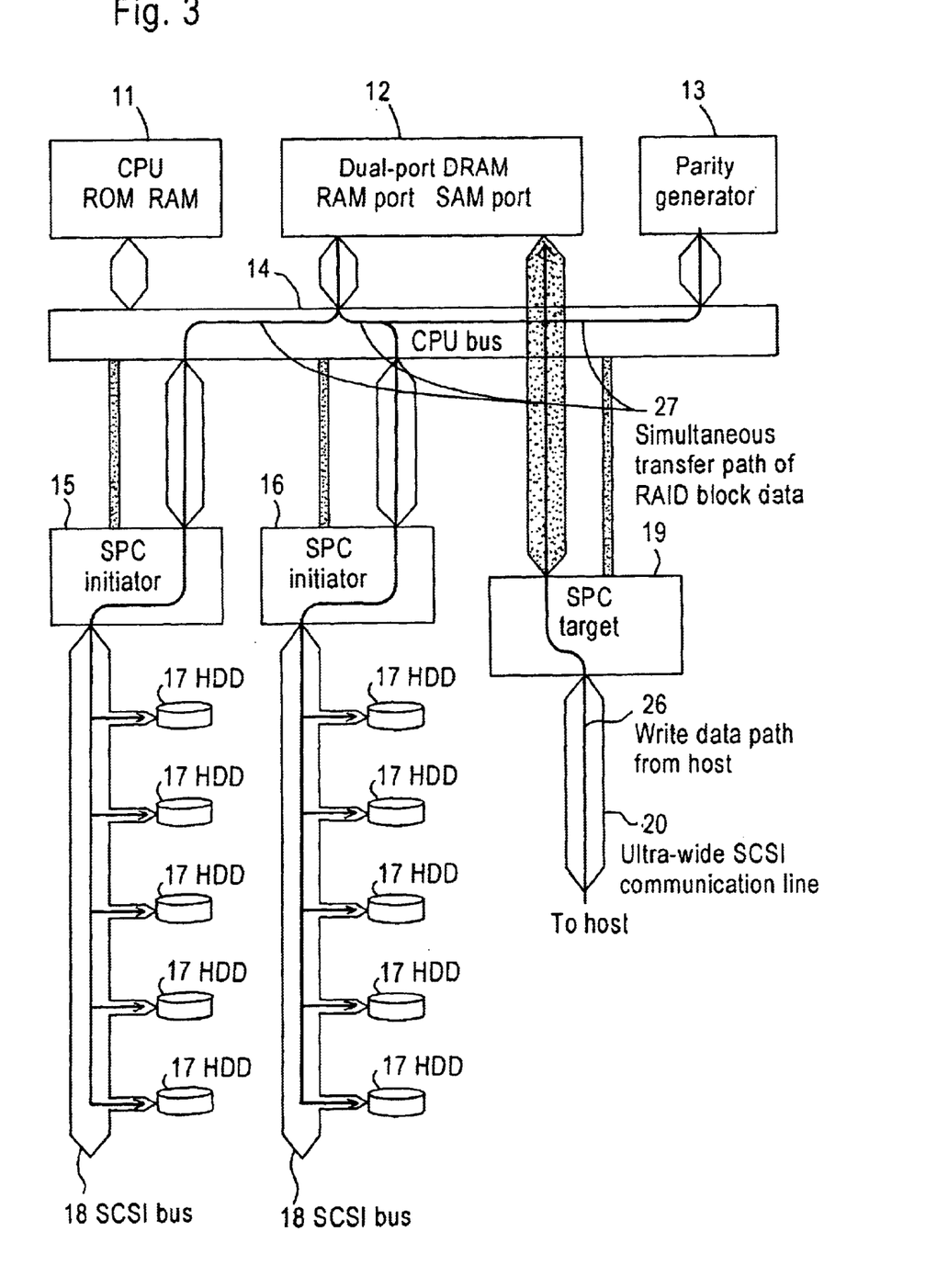
FIG. 3 is a flowchart of write information by the operation of the magnetic disk apparatus in FIG. 1.

Referring first to the accompanying FIG. 1 to FIG. 3, a first embodiment of the invention is described in detail below. FIG. 1 is a diagram showing a configuration of a magnetic disk apparatus according to RAID system in the first embodiment of the invention, FIG. 2 is a diagram showing the procedure of creating error-correcting information from write data by the operation of the magnetic disk apparatus in FIG. 1, and FIG. 3 is a flowchart of write data by the operation of the magnetic disk apparatus in FIG. 1.

In FIG. 1, the configuration of the magnetic disk apparatus in the first embodiment of the invention is described. As shown in FIG. 1, a central processing unit (CPU) 11 has ROM and RAM for storing program and control data. A dual-port DRAM 12 as high speed storage means is a high-speed memory for storing data from a host (external device) not shown and data read out from a magnetic disk 17 temporarily at high speed. The dual-port DRAM 12 can access, for example, a RAM port for input and output of data with the magnetic disk 17, and a SAM port for input and output of data with the host.

A parity generator 13 as error-correcting information generating means creates error-correcting information on the basis of the data entered from the host.

Figure 11A:
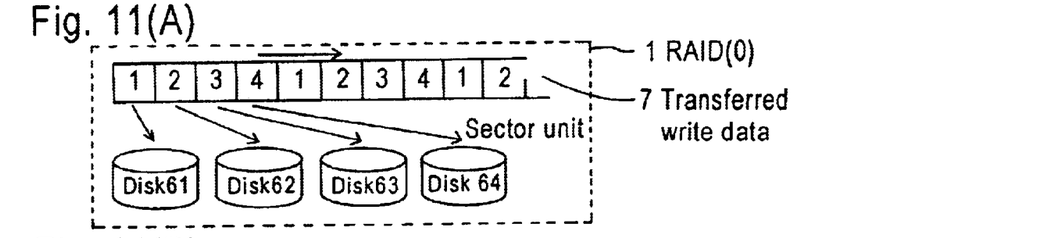
FIG. 11 shows the configuration of the conventional RAID(0) to RAID(5), (A) showing RAID(0), (B) showing RAID(1), (C) showing RAID(2) and RAID(3), (D) showing RAID(4), and (E) showing RAID(5).
Figure 11B:
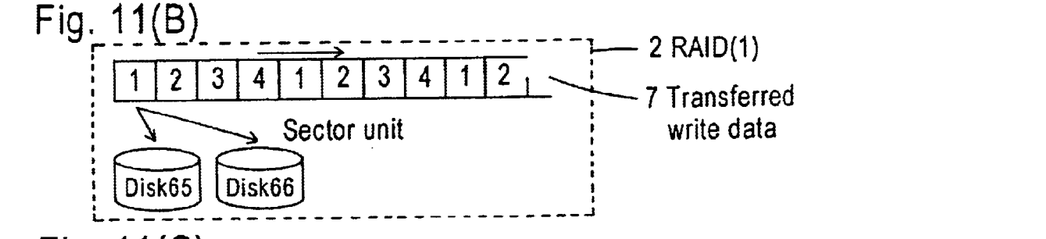
Figure 11C:
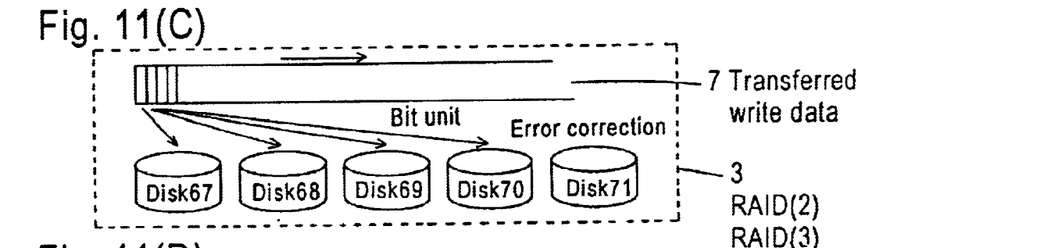
Figure 11D:
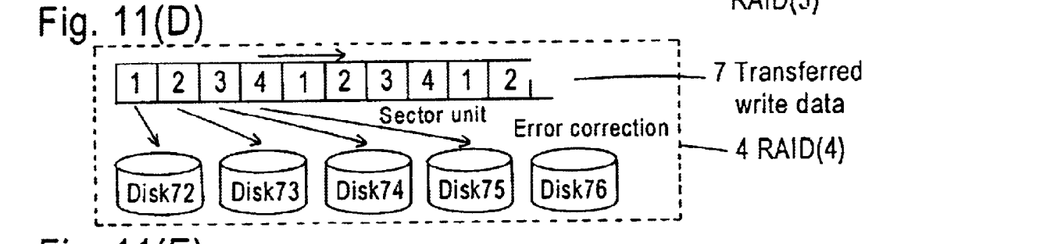
Figure 11E:
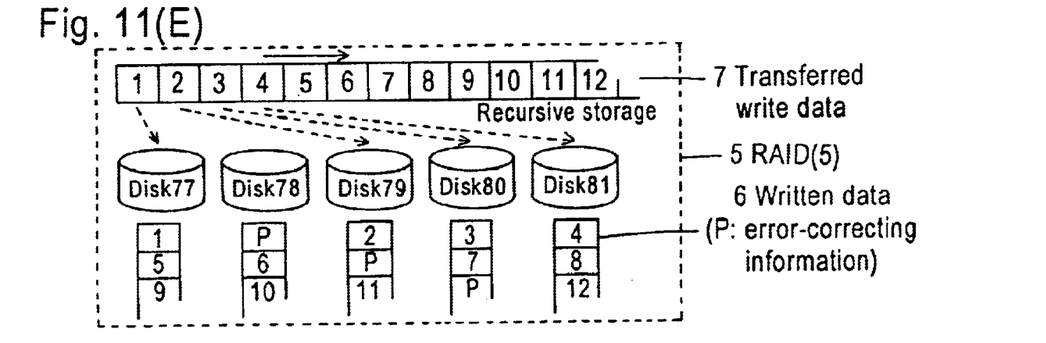

A data transfer path (or CPU path) 14 as data transfer means operates under the control of the CPU 11. SPC initiators 15, 16 as SCSI protocol controllers transfer data to the magnetic disk 17. The magnetic disk (including optical disk) 17 is also called hard disk device or disk (HDD), and one unit of RAID block is formed of plural magnetic disks as shown in FIG. 11 (A) to (E).

A data transfer path 18 (SCSI bus) transfers the data of the HDD 17. An SPC target 19 as communication means transfers data to the external device (host) by SCSI communication system. An ultra-wide SCSI communication line 20 exchanges control information and data with the host at ultra-high speed.

The operation of the magnetic disk apparatus of this embodiment is briefly described while referring to FIG. 1. The SPC target 19 receives data to be written into the HDD 17 from the host, and the data is directly stored in the dual-port DRAM 12, and the write command from the host is transferred to the CPU 11, and data writing in the HDD 17 is controlled. The CPU 11 creates the error-correcting information by the parity generator 13 in every RAID block (described later), and stores recursively, for example, in a disk 76 in the case of RAID(4) 4 shown in FIG. 11 (D), or in five disks 77 to 81 in the case of RAID(5) 5 shown in FIG. 11 (E).

The SPC target 19, when receiving a read command of data stored in one of the HDD 17 from the host, transfers it to the CPU 11, and controls reading of data from the HDD 17 specified by the command from the host. That is, the CPU 11 gives a command to the SPC initiators 15, 16, and reads out the data for one RAID block including the data of read command, together with the error-correcting information, from each HDD 17. If there is no problem in the HDD 17, the read data is directly sent out to the host.

On the other hand, if a trouble occurs, in one HDD 17 and reading is disabled, the data of the defective HDD 17 is created from the data and error-correcting information from other HDD 17 being readout, and correct data can be sent to the host, same as in the case of normal HDD 17.

Referring next to FIG. 2, the procedure of creating error-correcting information from the write data in the write operation of the magnetic disk apparatus of the embodiment is explained. To begin with, constituent elements in FIG. 2 are described. In FIG. 2, write data 21 from the host is the write data by the write command from the host shown in the times series. The dual-port DRAM 12 is the high-speed storage means for storing the data from the host and the read data from the magnetic disk 17 temporarily at high speed. The parity generator 13 as error-correcting information generating means creates. the error-correcting information on the basis of the data entered from the host. A data, group 22 in the error-correcting information generating unit is also called a data block, and it is called RAID block hereinafter in this embodiment, and data is divided and stored in each RAID block in plural magnetic disks 17. The dual-port DRAM 12 has its region divided in a plurality in RAID block (data block) units, and the write data from the host and read data from the magnetic disk 17 are stored in each RAID block.

Write data 25 is the data sent into the HDD 17 in batch after all data is entered in the dual-port DRAM 12 in error-correcting information generating units (RAID blocks), and simultaneous transfer branch data 23 is data sent to the parity generator 13 for creating error-correcting information by branching in the midst of sending the write data to the HDD 17 in batch.

Error-correcting information 24 is created in the parity generator 13, and is sent into the HDD 17. The thin-line arrow indicates the flow of data at the time of writing data into the HDD 17. The write data in this embodiment is, for example, audio and video data, or may be any write data of a large quantity.

FIG. 2 shows the procedure of creating error-correcting information from the write data in the magnetic disk apparatus. First, the write data 21 from the host is entered in the dual-port DRAM 12 in time series together with the write command from the host. The write data 21 from the host entered in the dual-port DRAM 12 is sent, as shown in FIG. 2, in a mixed state of data of A1 to A4 and data of B1 to B4 in this embodiment. The data of A1 to A4, and data of B1 to B4 individually differ in the address, and the data of A1 to A4 is stored in the storage region prepared for its RAID block, and the data of B1 to B4 is stored in the storage region prepared for its RAID block.

Receiving all of data of same RAID block (all data of A1 to A4, or all data of B13 to B4), when it is ready to create error-correcting information, the dual-port DRAM 12 sums up the data of the same RAID block, and sends out to the HDD 17 as the write data 25 to the HDD 17. This write data is branched on the way, and transferred also to the parity generator 13 simultaneously as the simultaneous transfer branch data 23.

On the basis of the entered data (for example, data of A1 to A4), the parity generator 13 creates error-correcting information AP, and writes into the corresponding HDD 17. Similarly, the data of B1 to B4 is entered as the data of the same RAID block, and sent into the HDD 17 as the write data 25 to the HDD 17, and at the same time, it is branched and transferred also to the parity generator 13 (the same one for the data of A1 to A4), and error-correcting information BP is created, and written into the corresponding HDD 17.

In this embodiment, the write data 21 from the host consists of two lines, that is, the data of A1 to A4 and the data of B1 to B4, but it is executed similarly if the number of lines of data increases. Thus, since the data to be transferred to the HDD 17 is transferred simultaneously to the parity generator 13, the transfer time to the parity generator 13 can be saved.

Referring next to FIG. 3, this is to explain the write data path for transferring simultaneously to the parity generator for creating the error-correcting information at the time of transfer of write data in the write operation of the magnetic disk apparatus of the embodiment. Constituent elements in FIG. 3 are described. In FIG. 3, reference numeral 26 is the write data path from the host for transferring the write data from the host to the dual-port DRAM 12, and 27 is the simultaneous transfer path of writing the RAID block data in the HDD 17 and transferring RAID block data to the parity generator 13 simultaneously, when all data for creating error-correcting information, that is, the data of that RAID block is entered to be ready for creating error-correcting information.

FIG. 3 shows the transfer operation of writing of the write data 21 (FIG. 2) from the host into the HDD 17 and simultaneous transfer to the parity generator 13. The write data 21 from the host is transferred and stored temporarily in the storage region for the corresponding RAID block of the dual-port DRAM 12 from the SAM port by way of the write data path 26 from the host. As shown in FIG. 2, this write data 21 is sent in a mixed state of data of plural RAID blocks.

When all data of the RAID block for creating the error-correcting information is entered and it is ready to create error-correcting information, this RAID block data is issued to the simultaneous transfer path 27 of the RAID block data, and written into the HDD 17, and is simultaneously transferred to the parity generator 13. The parity generator 13 creates error-correcting information, and issues similarly to the HDD 17.

The data transfer from the dual-port DRAM 12 is commanded by the CPU, and executed at high speed by using the DMA (direct memory access) for transferring the data directly between memories or between memory and input and output port. The parity generator 13 has a function of taking in the DMA data from the dual-port DRAM 12 by the control or command of the CPU, and this function is called the eavesdropping function. After sending a data intake command to the parity generator 13, the CPU issues a DMA execution command.

According to the method of data transfer of the magnetic disk apparatus of the embodiment, as the parity generator 13 eavesdrops on the DMA data, it is not necessary to send the DMA data newly to the parity generator 13, and the data transfer time can be saved.

Second Embodiment

Figure 4:
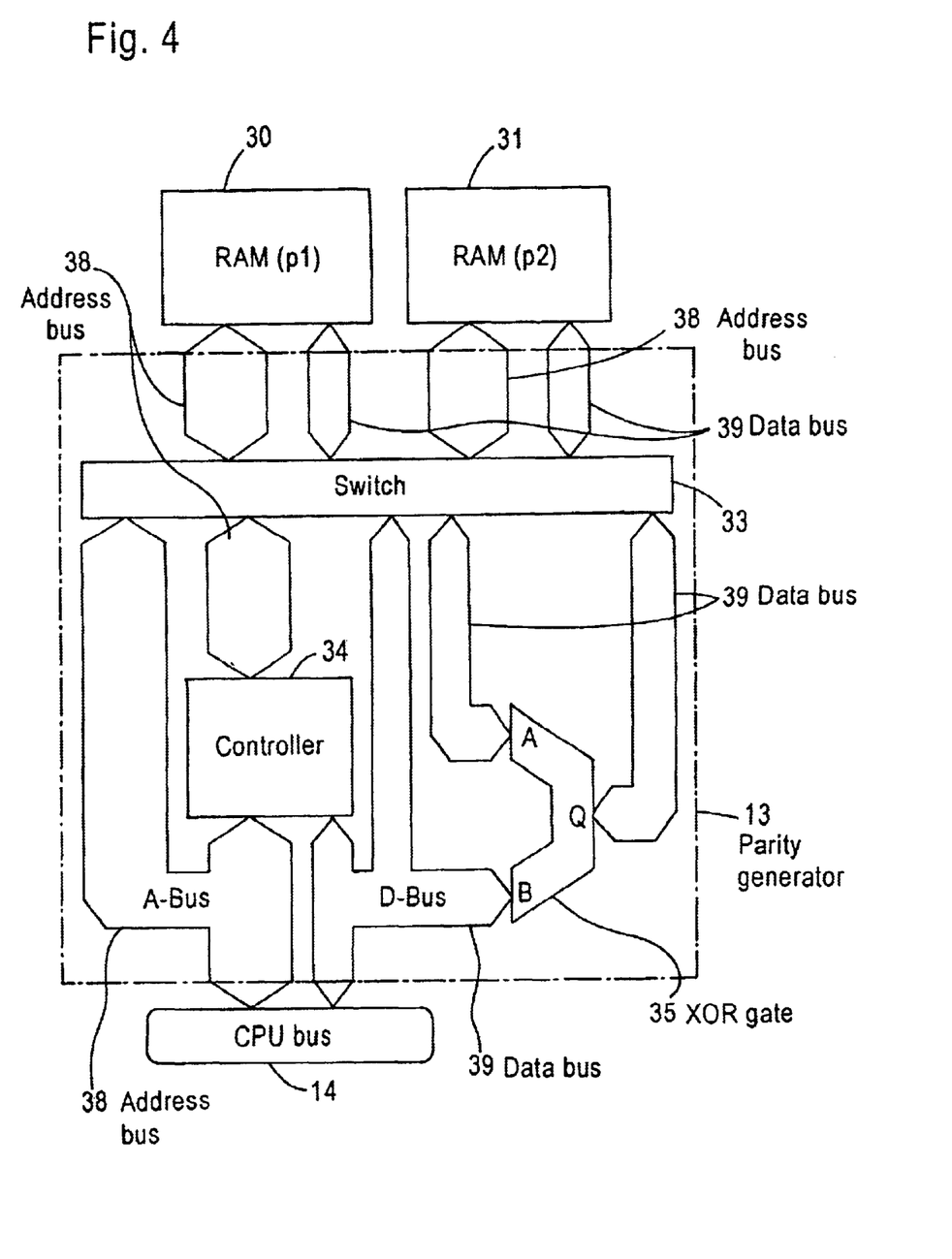
FIG. 4 is a block diagram of a parity generator in the magnetic disk apparatus in FIG. 1 according to the second embodiment.
Figure 6:
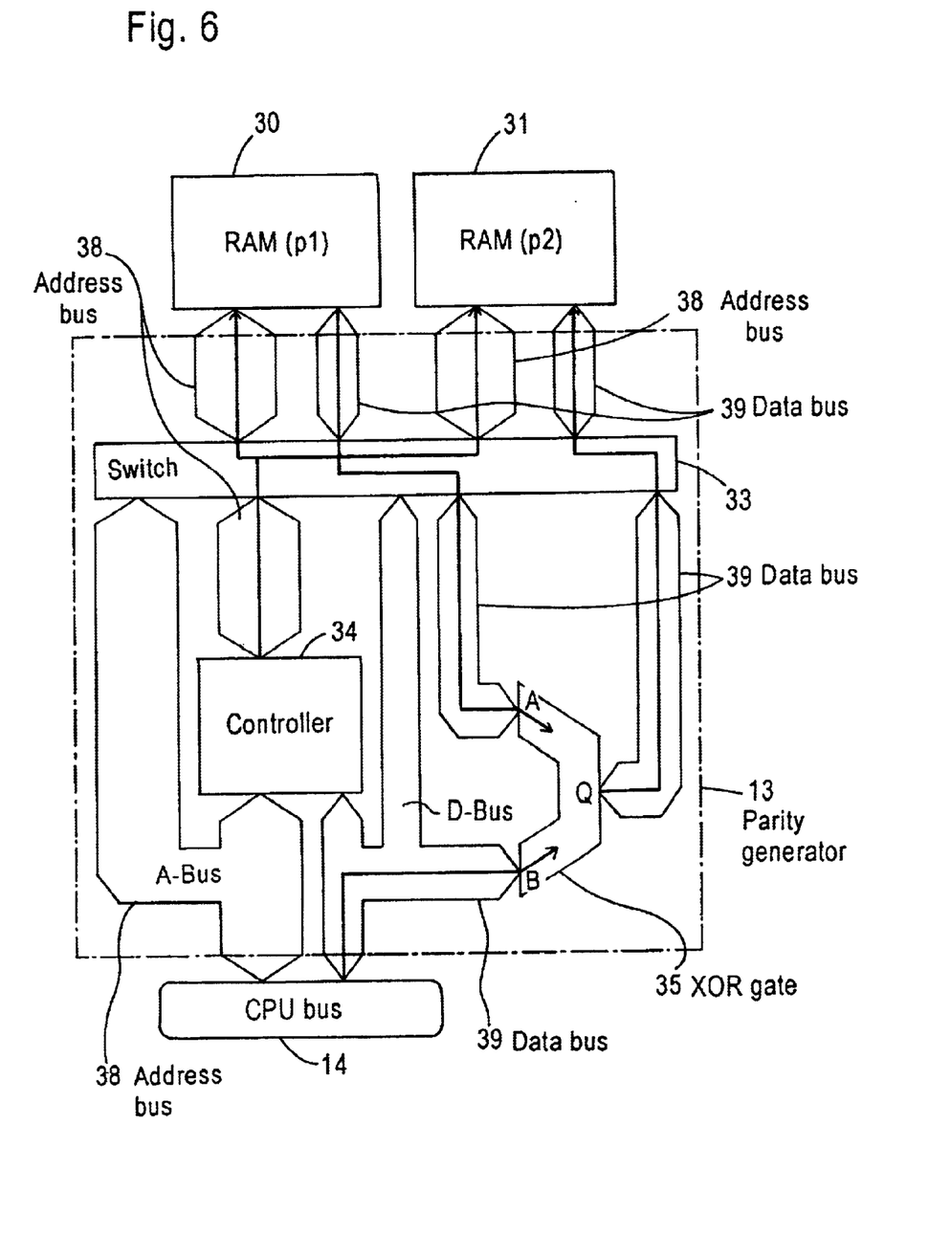
FIG. 6 is an explanatory diagram showing switch changeover mode 1 in parity data creation by the parity generator in FIG. 4.
Figure 7:
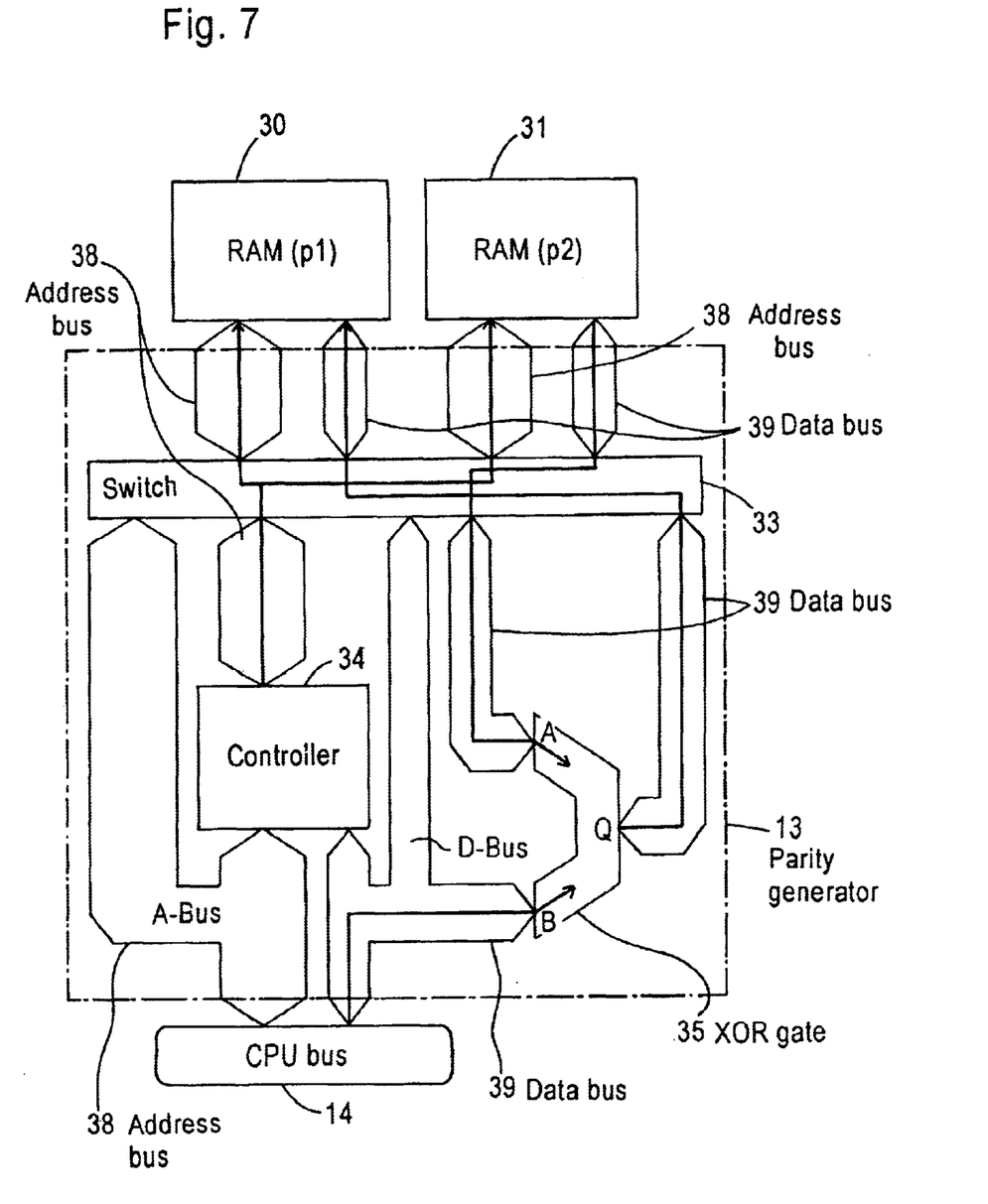
FIG. 7 is an explanatory diagram showing switch changeover mode 2 in parity data creation by the parity generator in FIG. 4.
Figure 8:
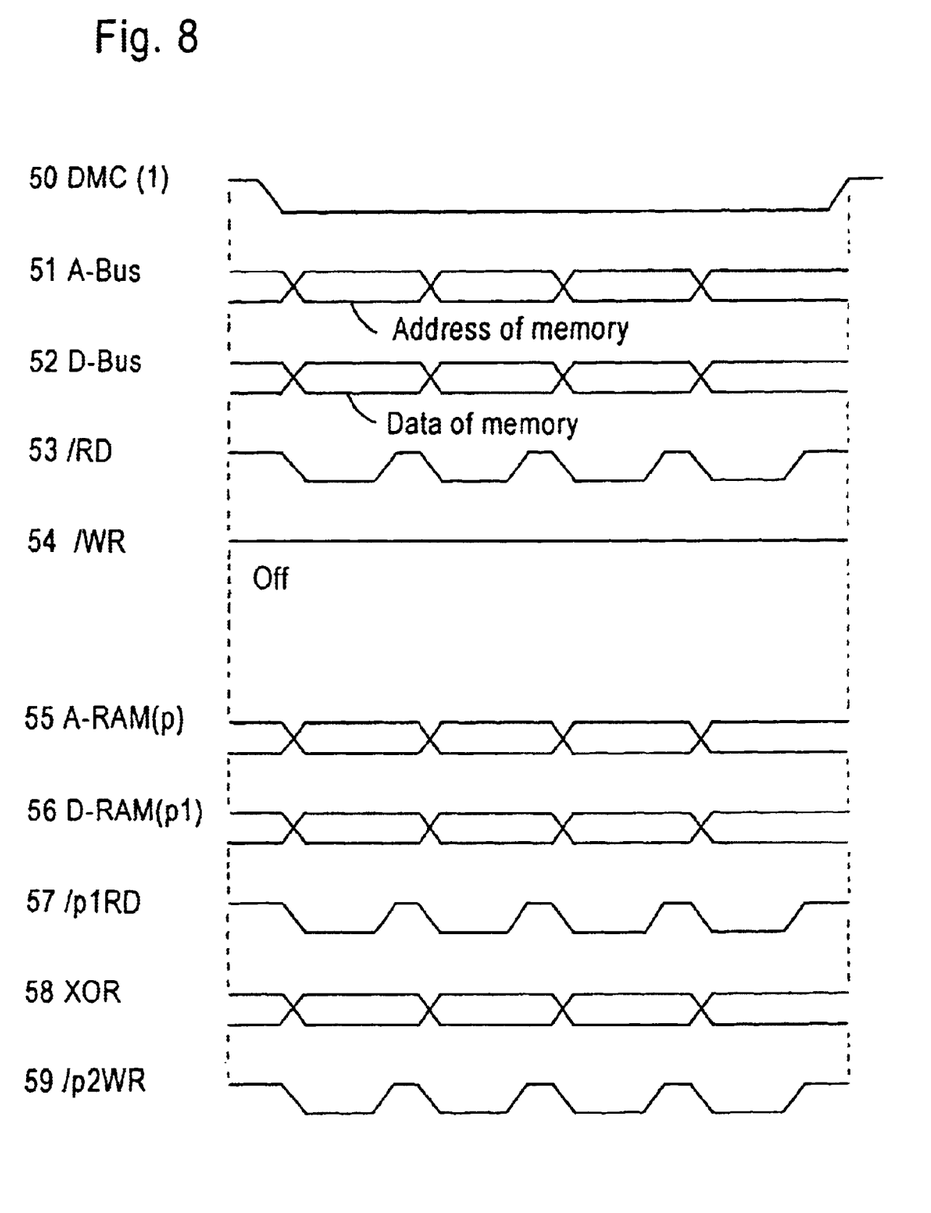
FIG. 8 is a timing chart showing the operation of parity data creation by the parity generator in FIG. 4, in which data D-Bus 52 of memory 12, and data D-RAM (p1) 56 of D-RAM (p1) of parity generator 13 are calculated by Xor, and XOR 59 is obtained.
Figure 9:
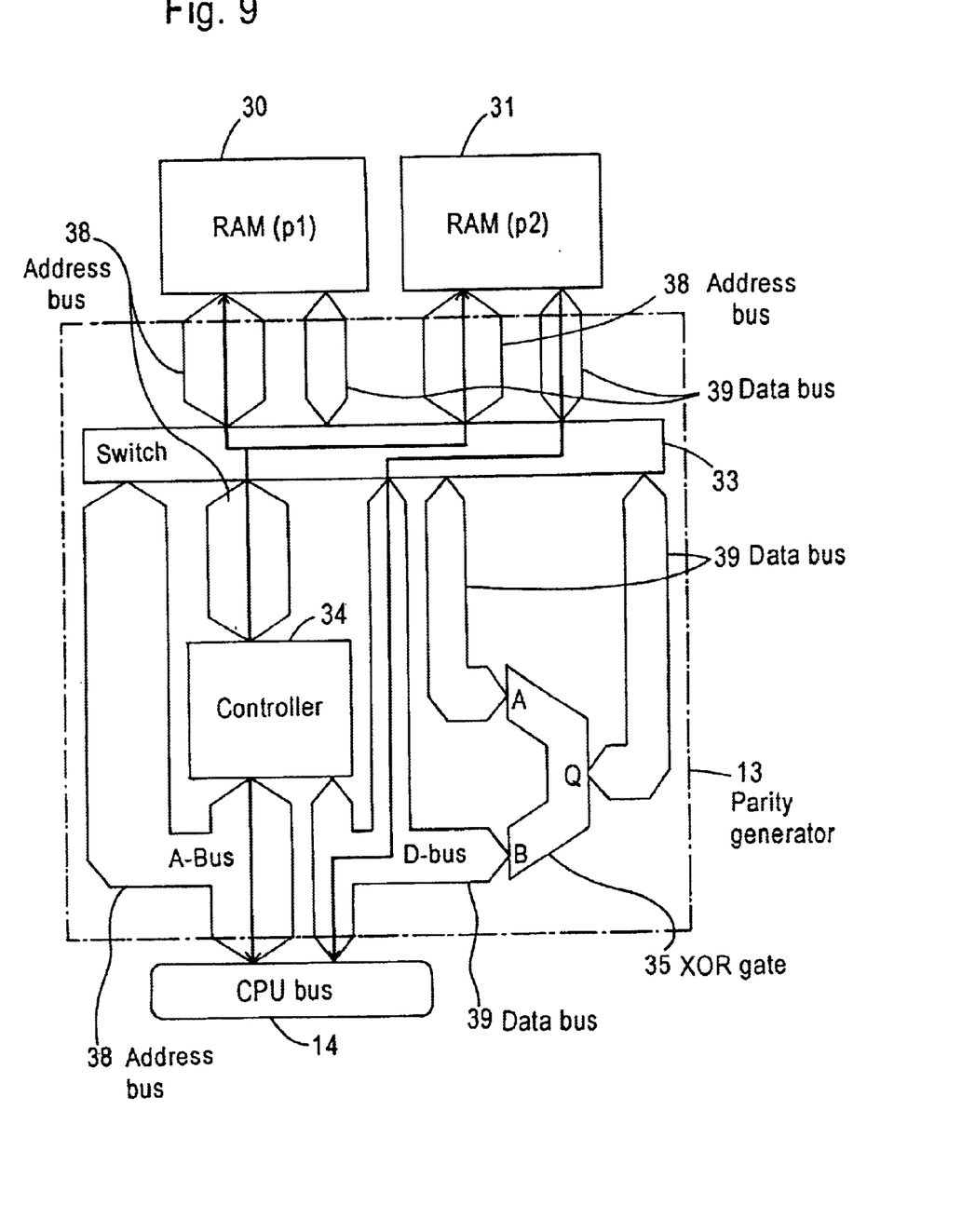
FIG. 9 is an explanatory diagram showing switch changeover mode 3 in parity data creation by the parity generator in FIG. 4.
Figure 10:
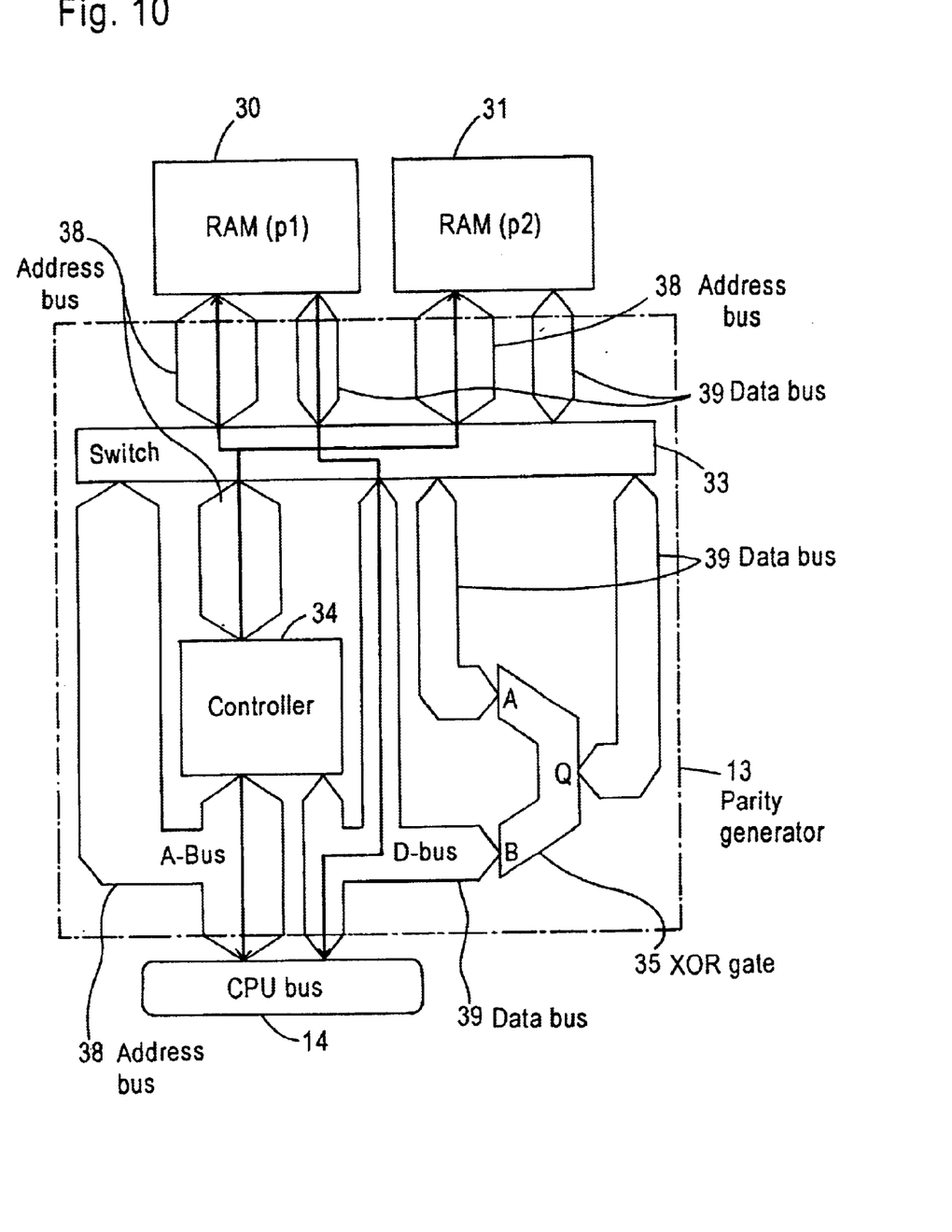
FIG. 10 is an explanatory diagram showing switch changeover mode 4 in parity data creation by the parity generator in FIG. 4.

A second embodiment of the invention is described in detail below while referring to the accompanying FIG. 1, and FIG. 4 to FIG. 10. FIG. 1 is, as already explained in the first embodiment of the invention, a block diagram showing the configuration of the magnetic disk apparatus according to the RAID system. FIG. 4 is a block diagram of a parity generator in the magnetic disk apparatus in FIG. 1, FIG. 5 is an explanatory diagram showing the operation of creation of parity data in the parity generator in FIG. 4, FIG. 6 is an explanatory diagram showing switch changeover mode 1 in parity data creation by the parity generator in FIG. 4, FIG. 7 is an explanatory diagram showing switch changeover mode 2 in parity data creation by the parity generator in FIG. 4, FIG. 8 is a timing chart showing the operation of parity data creation by the parity generator in FIG. 4, FIG. 9 is an explanatory diagram showing switch changeover mode 3 in parity data creation by the parity generator in FIG. 4, and FIG. 10 is an explanatory diagram showing switch changeover mode 4 in parity data creation by the parity generator in FIG. 4.

The constituent elements in FIG. 1 and the outline of operation of the magnetic disk apparatus are already explained in the first embodiment, and duplicate explanation is omitted.

Referring to FIG. 4, the configuration of the parity generator in the magnetic disk apparatus shown. in FIG. 1 is explained. In FIG. 4, the parity generator 13 has second high-speed storage means, RAM(p1)30 and RAM(p2) 31, which are memories for creating parity, connected outside. Herein, reference numeral 33 is a changeover switch of a data bus 39, 34 is a control circuit of the parity generator 13, 35 is an exclusive OR circuit (XOR gate) for calculating the exclusive OR (XOR) of input A and input B and issuing to Q output, 14 is a CPU bus for composing the RAID of the invention, 38 is an address information bus for transmitting address, and 39 is a data information bus for transmitting data.

Figure 5:
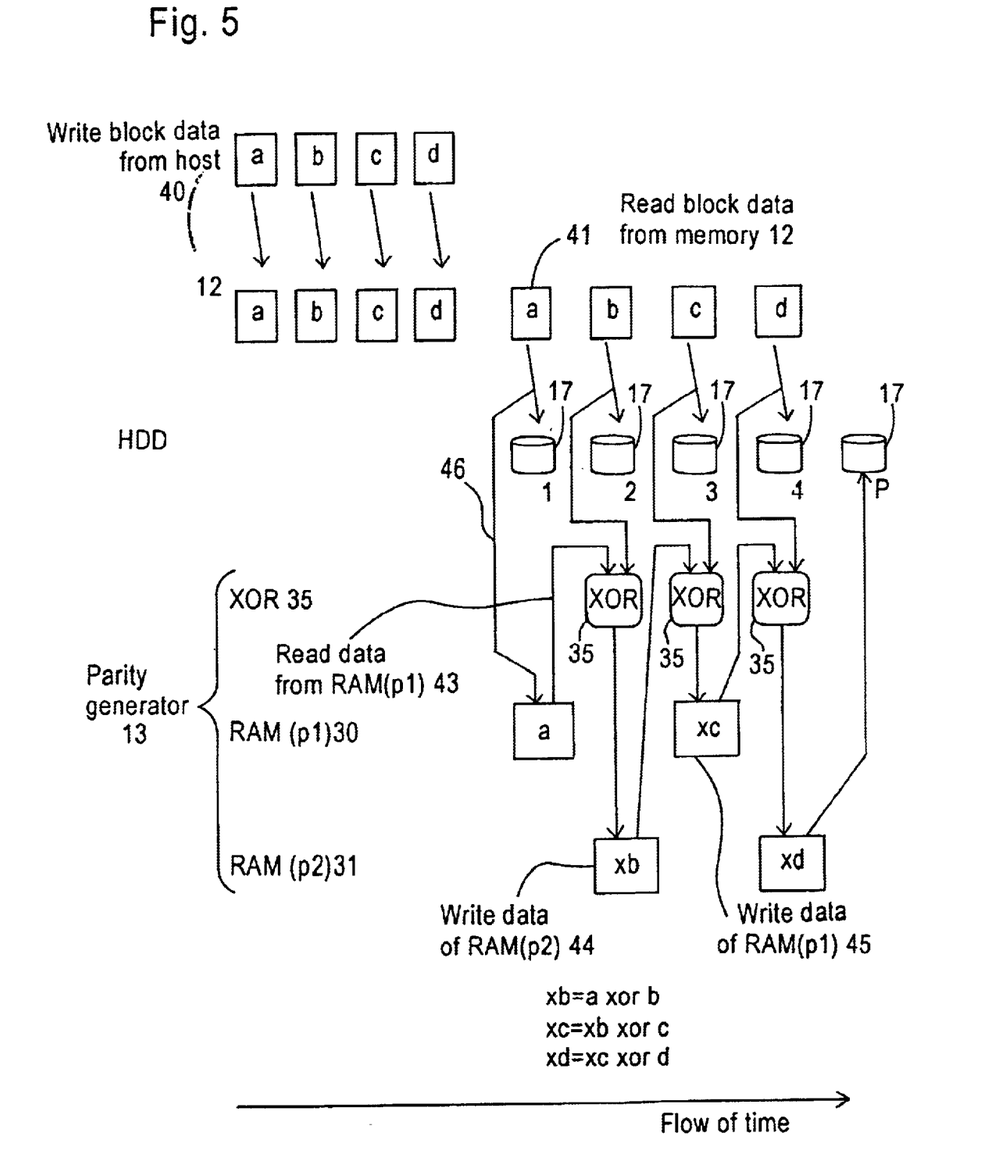
FIG. 5 is an explanatory diagram showing the operation of creation of parity data in the parity generator in FIG. 4, in which the parity generator eavesdrops on the transfer data to the HDD to create parity data (reference numeral 46).

Referring then to FIG. 5, the operation of the parity information creation in the parity generator shown in FIG. 4 is explained. This explanation relates to a case of the RAID (4) composed of five HDDs. In FIG. 5, reference numeral 40 is write block data from the host, 41 is read block data from the memory 12 in FIG. 1, 43 is read block data (a) from the RAM(p1), 44 is the write block data (xb) on the RAM(p2) 31, and 45 is write data (xc) of the RAM(p1).

The write block data 40 from the host is indicated in four blocks (a), (b), (c) and (d) in block units, and these four blocks compose the parity data of one block. That is, the four blocks form the error-correcting information generating unit. The write data 40 from the host is temporarily stored in the memory 12. When the four blocks (a), (b), (c) and (d) are completely received, the read block data (a) 41 is read out from the memory 12, and transferred to the HDD 17. This transfer is done by using the DMA, and the data appears on the CPU bus 14, for example, by one word each (one block composed of plural words), and the parity generator 13 reads the data, and writes in the RAM(p1) 30 as block (a).

Consequently, reading out block (b) from the memory 12, the data to be transferred to the HDD 17 is read by the parity generator 13, and the read data 43 from the RAM(p1) 30 (written as block (a) previously) and XOR are created, and written in the RAM(p2) 31 as write block (xb) 44.

Similarly, reading out block (c) from the memory 12, the data to be transferred to the HDD 17 is read by the parity generator 13, and the data (xb) 44 and XOR are created, and written in the RAM(p1) 30 as write block data (xc) 45. At this time, the block data (a) of the RAM(p1) 30 is erased by overwriting. Also, reading out the block (d) from the memory 12, the parity generator 13 reads the data to be transferred to the HDD 17, and the read data (xc) 45 from the RAM(p1) 30 and XOR are created, and block data (xd) is created on the RAM(p2) 31. The block data (xd) is the parity data of four blocks (a), (b), (c) and (d). The parity data is transferred from the RAM(p2) 31 to the HDD 17 for parity data.

FIG. 6 shows switch changeover mode 1 in parity data creation by the parity generator of the magnetic disk apparatus in FIG. 4. In this mode, reading out from the RAM(p1) 30 by changing over the switch 33, the data on the CPU bus 14 and XOR data are created, and written into the RAM(p2) 31. Both the RAM(p1) 30 and RAM(p2) 31 are specified at the same address by a controller 34. Changeover of the switch 33, address of block start end, and the number of words of each block are specified by the CPU 11, and the controller 34 uses the addresses after the address specified by the RAM(p1) 30 and RAM(p2) 31. Adding 1 to the address in every word, 1 is subtracted from the word counter. When the word counter becomes 0, processing of one block is complete.

FIG. 7 shows switch changeover mode 2 in parity data creation by the parity generator of the magnetic disk apparatus in FIG. 4. In this mode, reading out from the RAM(p2) 31 by changing over the switch 33, the data on the CPU bus 14 and XOR data are created, and written into the RAM(p1) 30. In this changeover mode 2, the memory address method and data writing and reading method are same as shown in FIG. 6, and the detailed description is omitted.

Referring to FIG. 8, the timing of parity data creation in the parity generator is explained. In FIG. 8, reference numeral 50 is a signal DMC(1) which is present on the CPU bus 14 and is turned on (low) during DMA execution, 51 is a signal A-Bus showing the address on the CPU bus 14, 52 is a signal D-Bus showing the data on the CPU bus 14, and 53 is a read signal /RD for commanding to read out the memory (dual-port DRAM) 12, which is a read command when turned on (low).

Reference numeral 54 is a write signal /WR for commanding to write in the memory (dual-port DRAM) 12, which is a write command when turned on (low). In the case shown in FIG. 8, there is no memory writing, and /WR 54 remains off. The signals of DMC(1) 50, A-Bus 51, and /RD 53 are included in the SPC initiator 15, SPC initiator 16, and SPC target 19, respectively, and are issued from the DMA controller which is operated by the command of the CPU 11.

Further, in FIG. 8, reference numeral 55 is an address signal A-RAM(p) which is present on the address bus 38 shown in FIG. 4 and shows the address corresponding, to the RAM(p1) 30 and RAM(p2) 31, 56 is a signal D-RAM(p1) which is present on the data bus 39 shown in FIG. 4, and shows the read data from the RAM(p1) 30, and 57 is a read signal /p1RD for commanding to read out from the RAM (p1) 30, and when turned on (low), the data of the address signal A-RAM(p) 55 is issued from the memory RAM(p1) 30.

Reference numeral 58 is an output data signal XOR of the XOR gate 35, and an exclusive OR of the D-Bus 52 and D-RAM(p1) 56 is issued herein. Reference numeral 59 is a write signal /p2WR for command to write in the RAM(p2) 31, and the data signal of XOR 58 is written into the address of A-RAM(p) 55. Herein, /RD 53, /p1RD 57, and /p2WR 59 are nearly same in waveform, and hence it is known that memories of nearly same speed may be used in the RAM (p1) 30, RAM(p2) 31, and dual-port DRAM 12.

When the read signal /RD 53 is turned off and turned on again, 1 is added to the address of the signal A-Bus 51 and signal A-RAM(p) 55, and this execution is repeated by the number of words in each block.

FIG. 9 shows switch changeover mode 3 in parity data creation by the parity generator of the magnetic disk apparatus in FIG. 4. In this mode, the controller 34 changes over the switch 33, and the data readout from the RAM(p2) 31 is issued by using the DMA. The controller 34 issues address to the RAM(p2) 31 and CPU bus 14, reads out the data of the RAM(p2) 31, and commands to write the data into the HDD 17 to the specified SPC initiator 15 or 16. The DMA of the controller 34 is executed by receiving the designation of RAM(p1) or RAM(p2) from the CPU 11, designation of address start end, and designation of the number of words in the block and the output destination address.

FIG. 10 shows switch changeover mode 4 in parity data creation by the parity generator of the magnetic disk apparatus in FIG. 4. In this changeover mode, the controller 34 changes over the switch 33, reads out the parity data created on the RAM(p1) 30 therefrom, and issues to the HDD. The other operation is same as FIG. 9, and duplicate explanation is omitted.

The illustrated embodiments are only example, and the invention is not limited to them alone. The invention may be varied and modified in details within the scope of the claims.

INDUSTRIAL APPLICABILITY

According to the magnetic disk apparatus and method of data transfer of the invention, in the constitution as set forth in claim 1 of the invention, in particular, by storing write data from the external device in the high-speed storage means in the error-correcting information generating unit, transferring all data to magnetic disks at once when storing all data in the error-correcting information generating unit, and eavesdropping on all transferred data by the error-correcting information generating means, therefore, writing of data in the magnetic disks and creation of error-correcting information are executed simultaneously to save the error-correcting information creation time, so that the data writing time can be shortened. That is, by setting the write data transfer speed of RAID4 and RAID5 capable of correcting errors closer to the write data transfer speed of RAID0, the magnetic disk apparatus capable of correcting errors and fast in the write data transfer speed is obtained.

In the invention as set forth in claim 2, as explained above, in particular, having the constitution in which plural storage regions are provided for storing all data in the error-correcting information generating unit, classifying and storing the written data from the external device in each divided storage region of the high-speed storage means, and transferring all data to the magnetic disks and error-correcting information generating means simultaneously when all data in the error-correcting information generating unit-is stored and it is ready to create error-correcting information, therefore, plural data groups in the error-correcting information generating unit can be received, and the data group ready for creation of error-correcting information can be first transferred to the magnetic disks, so that the transfer efficiency is enhanced.

In the invention as set forth in claims 3 and 4, as explained above, in particular, having the constitution in which high-speed memories of similar grade are used in the high-speed storage means (dual-port DRAM) and plural internal memories of the parity generator, by writing and reading in the second high-speed storage means in parallel operation, so as to execute and complete simultaneously, therefore, in spite of creation of error-correcting information from the write data corresponding to the HDD, mass data can be transferred at high speed nearly as in the RAID0.

In the invention as set forth in claim 5, having the steps as explained above, in particular, by storing all data in the error-correcting information generating unit to which the data received from the external device belongs sequentially in the storage region of the high-speed storage means until all is stored, and transferring all data in the error-correcting information generating unit stored in the storage region to the magnetic disks and error-correcting information generating means simultaneously, therefore, writing of data in the magnetic disks and creation of error-correcting information are executed simultaneously to save the error-correcting information creation time, so that the data writing time can be shortened. That is, by setting the write data transfer speed of RAID4 and RAID5 capable of correcting errors closer to the write data transfer speed of RAID0, the method of data transfer of the magnetic disk apparatus capable of correcting errors and fast in the write data transfer speed is obtained.

In the invention as set forth in claim 6, having the steps as explained above, in particular, in which the high-speed storage means has plural storage regions for storing temporarily all data in the error-correcting information generating unit to which the data received from the external device belongs, by dividing and storing the received data in each storage region, and when receiving all data in the error-correcting information generating unit in one storage region to be ready to create error-correcting information, transferring all data to the magnetic disks and error-correcting information generating means simultaneously, therefore, plural data groups in the error-correcting information generating unit can be received, and the data group ready for creation of error-correcting information can be first transferred to the magnetic disks, and the transfer time is saved so that the transfer efficiency is further enhanced.

What is claimed is:

1. A magnetic disk apparatus comprising a CPU for controlling analysis and transfer of data, communication means for receiving data from an external device, error-correcting information generating means for generating error-correcting information for the information in an error-correcting information generating unit including at least the data entered from said external device, magnetic disks for storing the data in the error-correcting information generating unit including the data from said external device and its error-correcting information, high-speed storage means for temporarily storing the data from said external device, and CPU bus for transferring data by connecting said CPU and each means, wherein the data entered from said external device is temporarily stored in the high-speed storage means, and when all data in the error-correcting information generating unit including the entered data is stored, data in the error-correcting information generating unit is transferred to said magnetic disks, said error-correcting information generating means eavesdrops on the data on said CPU bus such that when said data is transferred from said high-speed storage means to said magnetic disks via said CPU bus, said data is simultaneously transferred to said error-correcting information generating means via said CPU bus.

2. The magnetic disk apparatus of claim 1, wherein said high-speed storage means includes plural storage regions for storing all data in the error-correcting information generating unit including the data entered from said external device, the entered data is divided and stored in each storage region specified by said external device, and when all data in the error-correcting information generating unit is stored in one storage region and all data is transferred to said magnetic disks, said error-correcting information generating means eavesdrops on the data on said CPU bus.

3. A magnetic disk apparatus comprising a CPU for controlling analysis and transfer of data, communication means for receiving data from an external device, error-correcting information generating means for generating error-correcting information for the information in an error-correcting information generating unit including at least the data entered from said external device, magnetic disks for storing the data in the error-correcting information generating unit including the data from said external device and its error-correcting information, high-speed storage means for temporarily storing the data from said external device, and CPU bus for transferring data by connecting said CPU and each means, wherein input data from outside is classified and stored in the error-correcting information generating unit on the high-speed storage means, the stored data is transferred to plural magnetic disks in the magnetic disk units, said error-correcting information generating means eavesdrops on the data on said CPU bus, such that when said data is transferred from said high-speed storage means to said magnetic disks via said CPU bus, said data is simultaneously transferred to said error-correcting information generating means via said CPU bus, said error-correcting information generating means has plural second high-speed storage means, and therefore in the generating process of error-correcting information, writing job and reading job can be executed parallel in each second high-speed storage means.

4. The magnetic disk apparatus of claim 3, wherein said plural second high-speed storage means are two pieces, and while operating the previous stored data being read out from one second high-speed storage means and next transfer data, the result is written into other second high-speed storage means.

5. The magnetic disk apparatus of claim 4, wherein said high-speed storage means includes plural storage regions for storing all data in the error-correcting information generating unit including the data entered from said external device, the entered data is divided and stored in each storage region specified by said external device.

6. A method of data transfer of a magnetic disk apparatus comprising the steps of receiving data to be stored in magnetic disks from an external device and its write command, storing all data in an error-correcting information generating unit to which the data received from said external device belongs temporarily in a storage region of a high-speed storage means, and an error-correcting information generating means for eavesdropping on the data on a CPU bus such that when said data is transferred from said high-speed storage means to said magnetic disks via said CPU bus, said data is simultaneously transferred to said error-correcting information generating means via said CPU bus, when all data in the error-correcting information generating unit temporarily stored in the storage region of said high-speed storage means are transferred to said magnetic disks.

7. A method of data transfer of the magnetic disk apparatus of claim 6, wherein said high-speed storage means has plural storage regions for storing temporarily all data in the error-correcting information generating unit to which the data received from said external device belongs, said method further comprising the steps of dividing and storing the received data in the storage region specified by said external device, and when receiving all data in the error-correcting information generating unit in one storage region and transferring all data to said magnetic disks, said error-correcting information generating means eavesdrops on the data on said CPU bus.

8. A magnetic disk apparatus comprising:

a CPU for controlling analysis and transfer of data;

communication means for receiving data from an external device;

error-correcting information generating means for generating error-correction information for at least data entered from said external device;

magnetic disks for storing the data entered from said external device and said error-correction information;

high-speed storage means for temporarily storing the data entered from said external device; and a CPU bus coupled to said CPU, said error-correcting information generating means, said magnetic disks and said high-speed storage means, wherein said high-speed storage means initially receives the data entered from said external device, and when the data is transferred from said high-speed storage means to said magnetic disks via said CPU bus, said data is simultaneously transferred to said error-correcting information generating means via said CPU bus.

* * * * *